(No Model.)

W. COBLE, Jr.
CAR SEAT LOCK.

No. 414,293. Patented Nov. 5, 1889.

WITNESSES:
P. F. Eagle
L. Douville

INVENTOR
Wm Coble Jr.
BY John A. Wiedersheim
ATTORNEY

N. PETERS, Photo-Lithographer, Washington, D. C.

UNITED STATES PATENT OFFICE.

WILLIAM COBLE, JR., OF PHILADELPHIA, PENNSYLVANIA.

CAR-SEAT LOCK.

SPECIFICATION forming part of Letters Patent No. 414,293, dated November 5, 1889.

Application filed June 15, 1889. Serial No. 314,517. (No model.)

*To all whom it may concern:*

Be it known that I, WILLIAM COBLE, Jr., a citizen of the United States, residing in the city and county of Philadelphia, State of Pennsylvania, have invented a new and useful Improvement in Car-Seat Locks and Rests, which improvement is fully set forth in the following specification and the accompanying drawings.

My invention consists of a car-seat lock and rest for the arm of the back of the seat, said rest, when not in use, being flush with the adjacent portion of the arm-rest, and when required may be reliably placed in position by the action of said arm, the latter being then likewise locked, as will be hereinafter set forth.

Figure 1:
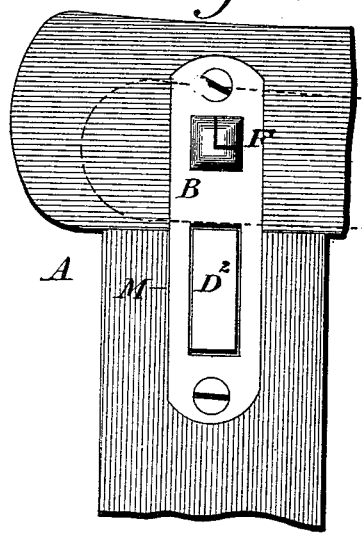
Figure 2:
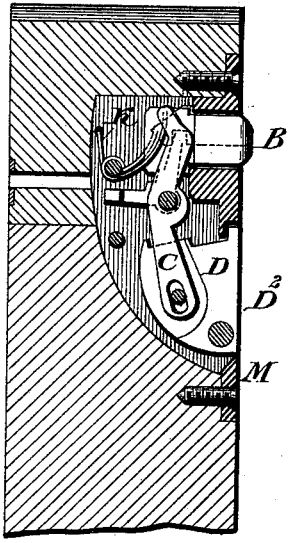
Figure 3:
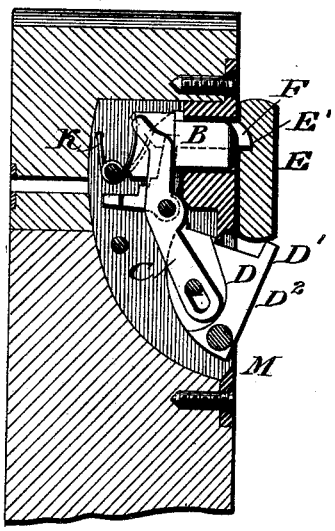
Figure 4:
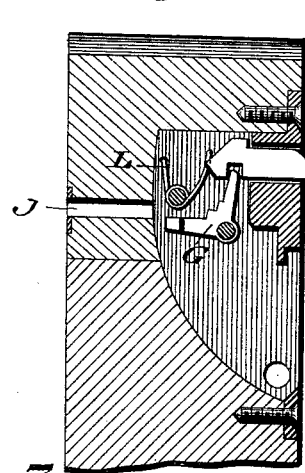
Figure 6:
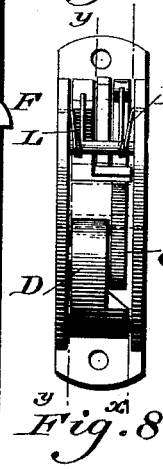
Figure 5:
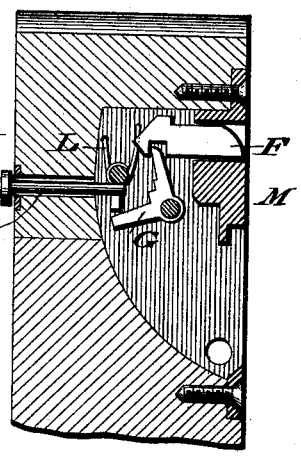
Figure 7:
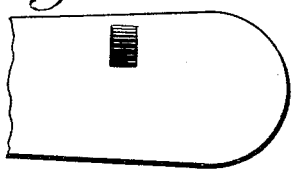
Figure 8:
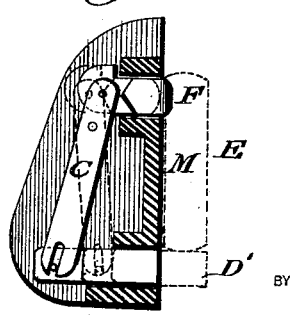

Figure 1 represents a face view of a car-seat lock and rest embodying my invention. Figs. 2 and 3 represent vertical sections on line $x\,x$, Fig. 6, the parts being in different positions. Figs. 4 and 5 represent vertical sections on line $y\,y$, Fig. 6, the parts being in different positions. Fig. 6 represents a view of the interior of the device, taken from the rear thereof. Fig. 7 represents a view of the inner face of the portion of the arm of the back of the seat. Fig. 8 represents a vertical section of a modification.

Similar letters of reference indicate corresponding parts in the several figures.

Referring to the drawings, A designates a portion of an arm-rest of a car-seat, which, excepting the features of my invention applied thereto, is of usual construction. In the rest A, near the end thereof, is fitted a sliding bolt B, with the back of which engages a lever C, said bolt being horizontal and the lever being vertical. Below the lever C is a pivotal piece D, forming a rest for the arm E of the back of the seat, the same having the lower end of the lever C freely connected with it, so that when the bolt B is pushed in the lever C is operated, and thus the upper end of the rest D is thrown out, whereby the arm E may be sustained thereon, as shown in Fig. 3.

F designates an auxiliary bolt, which is located aside of the bolt B and parallel therewith, its inner end being engaged by an elbow-lever or dog G, one limb of which is in such position that it may be engaged by a key H, the rest A having an opening J to receive said key.

A spring K bears against the bolt B or lever C, and a spring L bears against the bolt F or the lever G, whereby the several parts may be restored to and held in their normal positions.

The arm-rest is properly recessed to receive the several parts named, excepting the arm E, which, as usual in a car-seat, is connected with the back thereof and moves with said back as the latter is turned to change the seat.

The operation is as follows: When the back of the seat is turned or changed, the arm E bears against the two bolts B F and forces the same rearward until the recess E' in the back of the arm E reaches the nose of the bolt F, when the latter drops into said recess and locks said arm E. Simultaneously therewith the bolt B presses the lever C, and thus forces the rest D outward, so that the rest is projected under the arm E, and thereby sustains the latter, as will be seen in Fig. 3, the upper face of the rest having preferably a shoulder D', to receive the contact of the arm. When the back is to be turned or changed, the key H is inserted into the opening or hole J and rotated, whereby its bit bears against the elbow-lever G and moves the same, the effect of which is the withdrawal of the bolt F from the recess E' in the arm E, thus unlocking the latter. The back is now turned and the arm E leaves the bolts B F. As the bolt B is no longer controlled by the arm E, the springs K L become operative, whereby said bolt, the lever C, and rest D return to their normal positions, the rest fully entering the recess in the arm-rest A and its outer side $D^2$ being flush with the face-plate M, it being seen that said rest D presents no projecting parts which would cut or tear the hands or garments of the occupants of the seat.

The bolt B is cut away in longitudinal direction, so as to receive the bolt F, the two bolts presenting the appearance of a single bolt, with all the advantages of the same in reduced size, expense, &c., the noses of the bolts being beveled or rounded, so as to cause the arm E to work practically with the same and avoid sharp edges.

Having thus described my invention, what I claim as new, and desire to secure by Letters Patent, is—

1. In a car-seat lock and rest, a rest having its outer face $D^2$ flush with the face-plate, substantially as described.

2. In a car-seat lock and rest, a rest for the arm of the back of the seat, connected with a lever which is attached to a bolt with which said arm comes in contact, whereby said rest may be placed in operative position by the action of said arm, the parts named being combined substantially as described.

3. A car-seat lock and rest consisting of a bolt which engages with the arm of the back of the seat and locks the same, a rest which supports said arm, an auxiliary bolt which is engaged by said arm, a lever which is connected with said rest and auxiliary bolt, and a restoring spring or springs, substantially as described.

4. In a car-seat lock and rest, a locking-bolt for the arm of the back of the seat and a rest for said arm, said rest being connected with an auxiliary bolt, the bolts being fitted one within the other, substantially as described.

WILLIAM COBLE, JR.

Witnesses:
A. P. JENNINGS.
JAMES F. KELLY.